Jan. 19, 1932.  C. MOTT  1,841,624
WELDING ROD FOR PRODUCING HARD WELDS
Filed Dec. 28, 1927
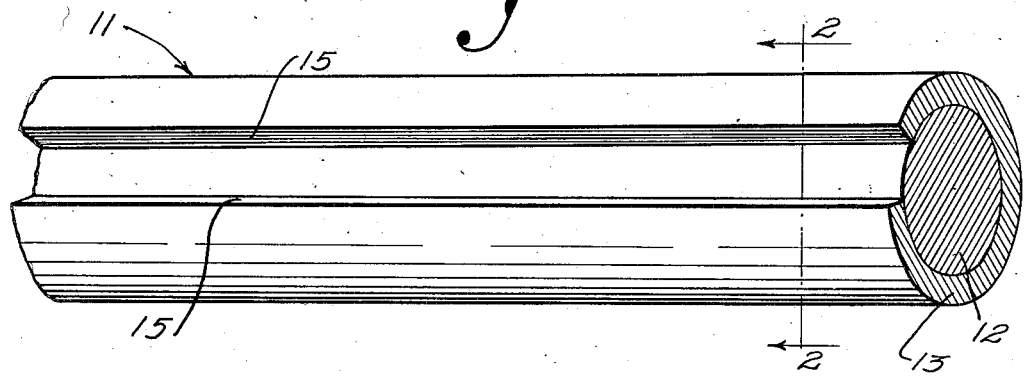
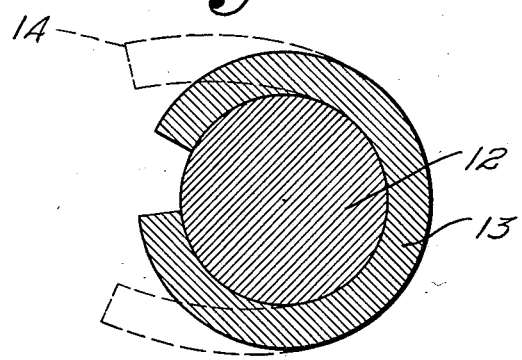
INVENTOR:
CHESTER MOTT,
BY
ATTORNEY.

Patented Jan. 19, 1932

1,841,624

UNITED STATES PATENT OFFICE

CHESTER MOTT, OF DENVER, COLORADO, ASSIGNOR, BY MESNE ASSIGNMENTS, TO UNION CARBIDE AND CARBON RESEARCH LABORATORIES, INC., A CORPORATION OF NEW YORK

WELDING ROD FOR PRODUCING HARD WELDS

Application filed December 28, 1927. Serial No. 243,037.

My invention relates to the welding art and particularly to a new type of welding rod.

It is frequently necessary or desirable to associate with a welding iron or rod a suitable alloying constituent to cause the weld to self harden. Prior to my invention the alloying constituent, in the form of granules, powder, or paste, has been wrapped in a mild steel strip with or without a core. This process does not easily permit the retention of absolutely uniform proportion of alloying constituent and iron.

It is an object of my invention to provide a welding rod composed of iron and alloying constituent in definite and uniform proportions.

It is a further object of my invention to provide such a welding rod as described above, all of whose constituents are easily workable before fusion and which after fusion develop into a hard weld.

It is a further object of my invention to provide a welding rod as described whose exterior surface shall be a good conducting medium so that it may readily be used in electrode holders in which the welding current must pass through the welding rod.

With the flux associated with the welding rod in the form of powder, granules, or paste, I have discovered that there is a tendency for loss in the desirable alloying constituents during the welding.

It is a further object of my invention to provide a welding rod in which the liability of loss of the desirable alloys in the welding process is very slight.

It is another object of my invention to produce a welding rod whose exterior surface is not subject to rust.

Another object of my invention is to provide a welding rod of the class described which may be easily and cheaply manufactured on a large production scale while retaining absolute uniformity in the proportions of flux and iron.

Fig. 1 is a perspective view of my invention.

Fig. 2 is a vertical cross section taken on the line 2—2 of Fig. 1.

The numeral 11 represents the welding rod of my invention, comprising a core 12 and a wrap or sheath 13. The sheath 13 is bent around the core 12, as shown by the dotted lines 14 of Fig. 2 and then, as shown in the full lines of the same figure, the sheath 13 is bent into non-slidable and non-rotatable engagement with the core 12. Since no loose particles are included within the sheath 13, it need only wrap around the core 12 to the extent necessary to retain it in position, so that the edges 15 of the sheath 13 may, if desired, be separated as shown in Fig. 1.

I have found that iron containing approximately from two to eight per cent of manganese, approximately four to ten per cent of chromium, and approximately one-tenth to two-tenths per cent of carbon, provides a metal that is extremely hard and therefore desirable for a weld metal, except that metal of such chromium and manganese content cannot be drawn, rolled, or machined.

I have discovered, however, that iron with a higher chromium content, for example fifteen per cent, is capable of being drawn, rolled and machined as is also iron with a low chromium content.

I therefore propose to make the core 12 of my welding rod 11 of a metal of sufficiently low chromium content to be workable and to make the wrap or sheath 13 of a metal of such chromium content as to render the wrap or sheath workable and provide the fused core and sheath with a sufficient proportion of chromium to develop a hard weld. This may be done over a wide variation of chromium contents with corresponding variations in the relative weights of core and sheath so as to form a welding rod having from 4% to 10% of chromium, as indicated above. It is preferable to use for the core a material containing less than 2% of chromium, and to use for the sheath a material containing more than 9% of chromium.

In one composition which I have found eminently desirable, I prefer to use for the sheath and alloy which contains approximately fifteen per cent of chromium and is workable and machinable. The relative weight of core and sheath, the composition of each, as well as the composition of the resultant weld is listed below:

|  | Sheath—1 part | Core—2 parts | Resultant weld—3 parts |
| --- | --- | --- | --- |
|  | % by weight | % by weight | % by weight |
| Carbon | 0.12 | .165 | 0.15 |
| Manganese | 0.50 | 4.25 | 3.00 |
| Chromium | 15.00 | 0.00 | 5.00 |
| Iron | 84.38 | 95.585 | 91.85 |
|  | 100.00 | 100.00 | 100.00 |

Although I have given one composition of my welding rod above, I do not wish to be restricted to this composition for it is entirely within the scope of my invention to vary the composition and relative weights of core and sheath within any limits which permit both core and sheath to be workable while developing by their fusion a hard weld. It is likewise within the scope of my invention to make the core 12 of a high chromium content and the sheath 13 of a low chromium content.

But while I have particularly described chromium as being the element controlling the hardness of the resulting weld and the workability of the core and sheath, it should be understood that other elements having similar characteristics might be substituted therefor, and my invention broadly comprehends a sheath and core having different percentages or different amounts of a substance controlling the hardness of the resulting weld when the sheath and core are alloyed during weld. Similarly, the terms "sheath" and "core" are not to be interpreted only in their narrowest meaning, for while it is desirable to have the sheath surround or partially surround the core, the essence of the invention does not lie in such a construction. The metallic bodies forming the sheath and core may be attached together by any means, regardless of whether or not the sheath is bent around the core.

I claim as my invention:

1. A welding rod comprising elements assembled in the following relative proportions: a sheath composed of substantially 15% of chromium and traces of carbon and manganese, the balance being iron; and a core composed of substantially 4% manganese and a trace of carbon, the balance being iron, said core and said sheath being attached together in such relative proportions that there is substantially twice as much core material as sheath material in said welding rod.

2. A welding rod comprising: an iron core containing a substantial amount of chromium up to approximately 2%; and an iron sheath containing more than approximately 9% of chromium, the total chromium content in said rod being 4% to 10%.

In testimony whereof, I have hereunto set my hand at Denver, Colorado, this 20th day of December, 1927.

CHESTER MOTT.